F. OPPENHEIM.
Vehicle Spring.
No. 196,820. Patented Nov. 6, 1877.
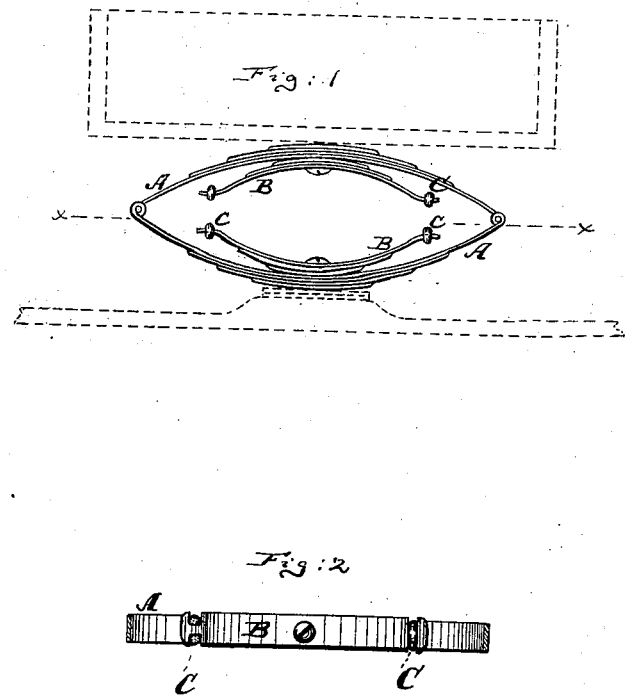
Witnesses:
John C. Tunbridge
D. v. Briesen
Inventor:
Fred'k. Oppenheim
by his attorney
A. v. Briesen

UNITED STATES PATENT OFFICE.

FREDERICK OPPENHEIM, OF SAN FRANCISCO, CALIFORNIA.

IMPROVEMENT IN VEHICLE-SPRINGS.

Specification forming part of Letters Patent No. 196,820, dated November 6, 1877; application filed October 12, 1877.

*To all whom it may concern:*

Be it known that I, FREDERICK OPPENHEIM, of San Francisco, in the county of San Francisco and State of California, have invented a new and Improved Vehicle-Spring, of which the following is a specification:

This invention relates to an improvement on auxiliary springs which are applied to and used in connection with elliptic or semi-elliptic carriage-springs; and has for its object to provide such auxiliary springs with means whereby the rattling noise is avoided which has heretofore been produced when their contact points or ends touched each other, or the carriage-body, or the elliptic springs, according to the kind of springs used during the oscillating motion of the vehicle.

The invention consists in providing the auxiliary springs at their contact points or ends with notches for receiving noiseless elastic cushions, all as hereinafter more fully described.

In the accompanying drawing, Figure 1 is a side view of a spring, showing the invention; and Fig. 2, a horizontal longitudinal section on the line *x x*, Fig. 1.

Similar letters of reference indicate corresponding parts in all the figures.

I have shown the invention applied to a double auxiliary spring, the ends of which constitute the contact-points; but the invention may be as well applied to a single auxiliary spring, which makes contact with the elliptic spring, or with the carriage-body, or to other kinds of auxiliary springs.

The letter A represents an elliptic spring applied to a carriage or other vehicle in the customary manner. B is a double auxiliary spring, placed within the elliptic spring A; but such spring may be otherwise applied to the elliptic spring, and may be made single instead of double.

During the oscillating motion of the vehicle the ends of the auxiliary spring rapidly make and break contact, thereby producing the rattling noise which it is the object of the present invention to avoid.

C are noiseless elastic cushions, made of rubber, leather, or other equivalent material, and firmly attached to the contact points or ends of the auxiliary spring B by notching the auxiliary spring at the ends and slipping the cushions, which are made annular, into the notches.

It will be seen that the cushions C will effectually prevent the rattling at the contact-points of the auxiliary spring without impairing its usefulness.

I claim as my invention—

In combination with the main spring A and auxiliary spring B, which has notched ends, the noiseless cushion C, which is attached to the auxiliary spring B at its contact point or points, substantially as and for the purpose specified.

The foregoing description of my invention signed this 6th day of October, 1877.

FREDK. OPPENHEIM.

Witnesses:
F. V. BRIESEN,
A. V. BRIESEN.